T. W. VARLEY.
ELECTRICAL MEASURING INSTRUMENT.
APPLICATION FILED OCT. 3, 1913.

1,234,976.

Patented July 31, 1917.
2 SHEETS—SHEET 1.

WITNESSES:
Fred A. Lind.
J H Procter

INVENTOR
Thomas W. Varley
BY
Wesley G. Carr
ATTORNEY

T. W. VARLEY.
ELECTRICAL MEASURING INSTRUMENT.
APPLICATION FILED OCT. 3, 1913.

1,234,976.

Patented July 31, 1917.
2 SHEETS—SHEET 2.

WITNESSES:
Fred A. Lind
J H Procter

INVENTOR
Thomas W. Varley
BY
Wesley G. Carr
ATTORNEY

UNITED STATES PATENT OFFICE.

THOMAS W. VARLEY, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,234,976.      Specification of Letters Patent.      Patented July 31, 1917.

Application filed October 3, 1913. Serial No. 793,123.

*To all whom it may concern:*

Be it known that I, THOMAS W. VARLEY, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to watthour meters.

The object of my invention is to provide a direct current watthour meter of novel construction which admits of the use of iron in the main magnetic circuit.

A direct current watthour meter as heretofore constructed has usually comprised a stationary field winding that was excited in proportion to the current and an armature winding that was excited in proportion to the voltage, thus causing a torque to be developed in the armature that was proportional to the product of the voltage and the current. Damping was usually applied by some auxiliary device. In my present invention, I provide a very compact meter having two visual poles but possessing the torque characteristics of a four pole meter. I provide also means whereby the use of a permanent magnet in the main circuit does not effect the calibration of the instrument but acts as a damping means, as shown in my U. S. applications Serial Numbers, 488652 filed April 8, 1909, and 615553 filed March 20, 1911, which disclose various types of direct current watthour meters of the same general type as that embodying my present invention.

Figure 2:
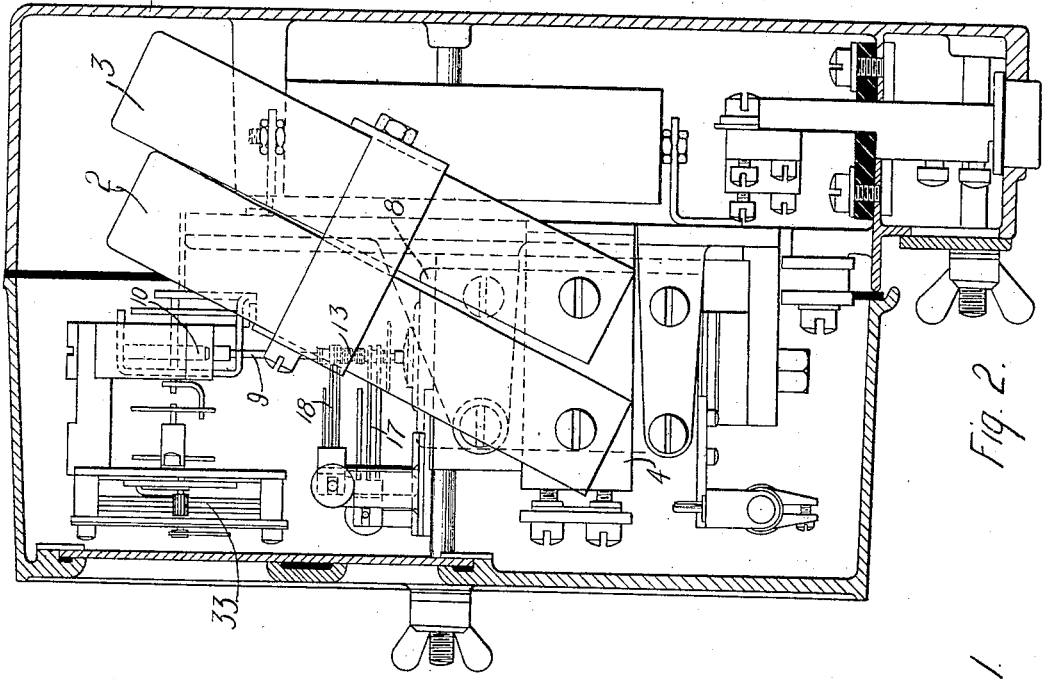
Figure 1:
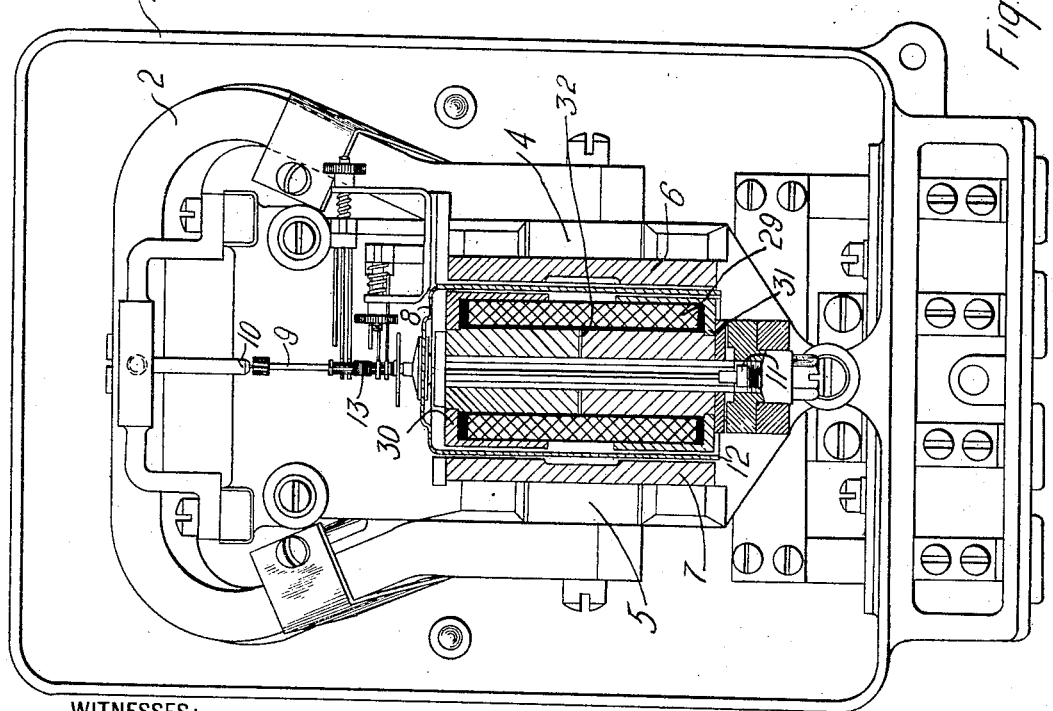
Figure 4:
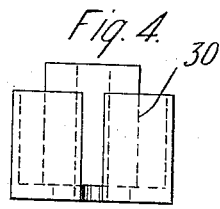
Figure 5:
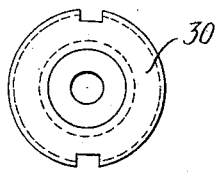
Figure 11:
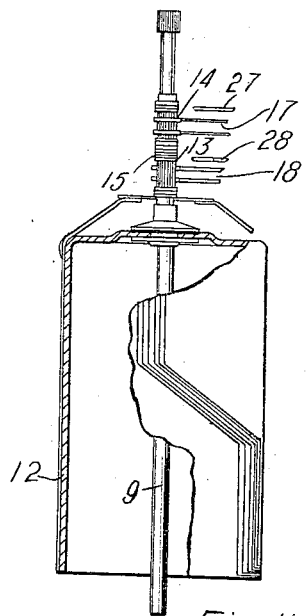
Figure 3:
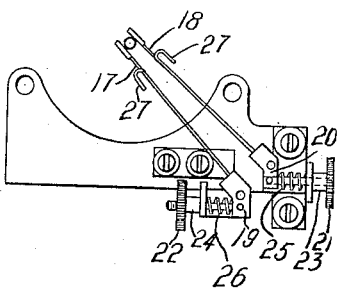
Figure 9:
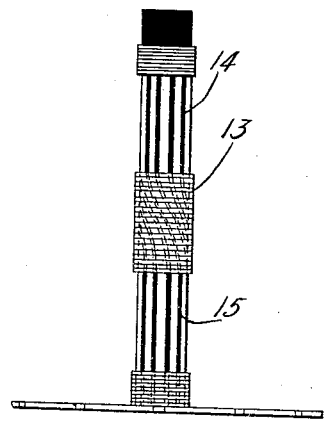
Figure 6:
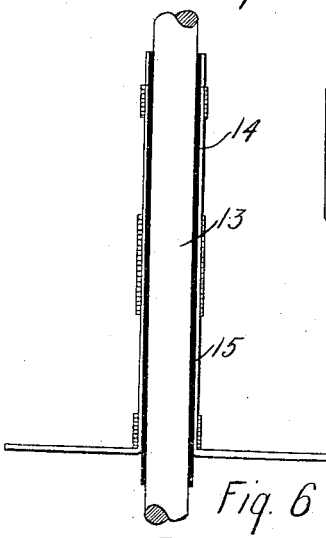
Figures 7, 8:
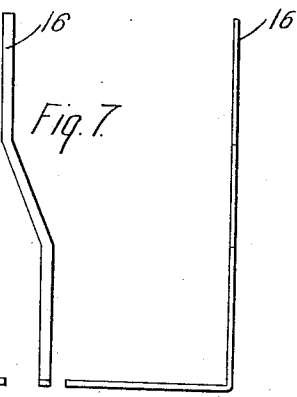
Figure 10:
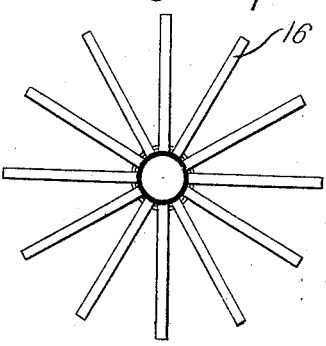

In the accompanying drawings, Figure 1 is a front view of a watthour meter embodying my invention, shown partially in section and partially in elevation, Fig. 2 is a side view, partially in section and partially in elevation, of the watthour meter shown in Fig. 1, Fig. 3 is a plan view of the brush mechanism used in my invention, Fig. 4 is an elevational view of a field pole piece which is embodied in my invention, Fig. 5 is a plan view of the field pole piece shown in Fig. 4, Fig. 6 is a sectional view of the commutator embodied in my invention, Fig. 7 is a front elevational view of a commutator bar, Fig. 8 is a side elevational view of a commutator bar, Fig. 9 is an elevational view of the commutator used in my invention, Fig. 10 is a bottom plan view of the commutator shown in Figs. 6 and 9, and Fig. 11 is a view of the assembled armature and commutator of my invention, shown partially in elevation and partially in section.

My invention comprises a case 1, permanent magnets 2 and 3 fastened to bars of magnetic material 4 and 5 and pole pieces 6 and 7 attached to the bars 4 and 5. Between the concave surfaces of pole pieces 6 and 7 is an armature 8 which is supported by a shaft 9 having bearings 10 and 11. The armature 8 comprises a cylindrical metallic structure 12 and an armature winding which is twisted or displaced on the lower part 90 degrees away from the upper part in order to form a double 4 pole winding. The armature conductors are connected to the bars 16 of a commutator cylinder 13 comprising two parts 14 and 15 disposed in tandem relation. The opposite ends of the commutator have a relative angular displacement of 90 degrees so that brushes 17 and 18 can be placed 180 degrees apart. The brushes 17 and 18 are attached to pivotally mounted blocks 19 and 20 which may be adjusted by means of thumb nuts 21 and 22 and screws 23 and 24 against the force of springs 25 and 26. Guide members 27 and 28 consisting of metal strips that are bent at their ends are attached to the pivotally mounted blocks 19 and 20 in normally direct alinement with the brushes 17 and 18, respectively. The armature rotates around a coil 29 which is placed within it and which has pole pieces 30 and 31 separated by a nonmagnetic washer 32. The armature 8 drives an integrating mechanism 33 through its shaft 9. The pole pieces 30 and 31 are of peculiar construction, being provided with slits along the outer cylindrical portion at two places diametrically opposite to each other.

Current is supplied to the armature 8 that is proportional to the current in the circuit the power of which is to be measured, and the field coil 29 is excited by current at a voltage that is proportional to the voltage of the line the power of which is to be measured. Magnetic flux will emanate from one pole of the field winding 29, pass through both of the pole pieces 6 and 7 and enter the other pole of the field winding. A second magnetic flux emanates from one permanent pole piece and passes to the other, the combined effect being such as to cause a shifting of the permanent magnetic flux from one end of the armature to the other, so that it will have to pass through the non-magnetic barrier 32, thus polarizing the field magnets and causing the characteristic voltage curve of the instrument to approach a straight line.

The permanent magnets create such a drag upon the cylindrical metallic structure 12 as to damp its movement. The damping action is proportional to the sum of the permanent magnetic fluxes which tread through each of the two armature windings. The torque of the meter is proportioned to the product of the difference between the two fluxes which thread through the two armatures and the armature flux and, since the difference in the two fluxes is proportional to the voltage, the resultant torque is proportional to the watts.

Considering the upper pole 30 as a north pole, the magnetic flux which emanates from both sides of it forms two poles of the same sign. In order to utilize the useful lines of magnetic flux, the armature must have a 4 pole winding. As poles 30 and 31 are of opposite sign and have the same characteristics, pole 31 must also have a 4 pole armature. If the conductors of the armature 8 were vertical and cut the flux of both poles of opposite sign at once there would be no resulting motion, hence the lower part of the armature must be displaced 90 degrees, either as a separate structure as a part of a single spirally wound structure or as shown in Fig. 11 to provide the advantage of the increased torque of a four pole motor with only two visual poles and a single field winding.

The brushes of a 4 pole motor are usually spaced 90 degrees apart which causes a side thrust on the commutator. In my invention, I twist one section of the commutator around 90 degrees so that the brushes can be placed 180 degrees apart and thus precluding any side thrust on the bearings.

The relative pressure of the brushes 17 and 18 on the commutator can be observed by noticing the difference in the alinement of the brushes and the alining members 27 and 28, respectively. Another novel feature of my invention is the method of distributing the magnetic flux equally over the whole face of each of the pole pieces 6 and 7. To do this, I provide the magnetic bars 4 and 5 which are connected to the pole pieces 6 and 7 thus allowing the magnets 2 and 3 to distribute a permanent magnetic flux evenly over the whole surface of each of the bars 4 and 5 and then over the pole pieces 6 and 7. The magnets 2 and 3 are placed in the angular position shown for reasons of space economy.

The rotation of the armature 8 operates the integrating mechanism 33 in the usual way and need not be discussed here.

Changes in the size and shape of my invention may be made without departing from the scope of the same as covered by the appended claims.

I claim as my invention:

1. In a wattmeter, the combination with an armature cylinder having a four-pole winding thereon, of a permanent field magnet having a pair of pole faces for each of its poles, and means disposed within the armature cylinder for shifting the flux from one permanent-magnet pole face to another.

2. A meter comprising a two-pole magnet having a substantially constant field and a pair of pole faces for each pole, an armature cylinder having a winding thereon disposed between the pole faces and means disposed within the armature cylinder for maintaining a difference in magneto-motive force between the two pole faces of each pole of the magnet.

3. A meter comprising a two-pole magnet having a substantially constant field and a pair of pole faces for each pole, an armature cylinder having a winding thereon disposed between the pole faces and electromagnetic means disposed within the armature cylinder for maintaining a difference in magneto-motive force between the two pole faces of each pole of the magnet.

4. A meter comprising a two-pole magnet having a substantially constant field and a pair of pole faces for each pole, an armature cylinder having a four-pole winding thereon disposed between the pole faces and stationary means disposed within the armature cylinder for maintaining a difference in magneto-motive force between the two pole faces of each pole of the magnet.

5. A meter comprising a two-pole permanent magnet having a pair of pole faces for each pole thereof, an armature cylinder having a two-part winding thereon, the two parts thereof being displaced 90°, and stationary means disposed within the armature cylinder for shifting the flux from one pole face to another.

6. In a wattmeter, the combination with an armature cylinder having a two-part winding thereon, the parts of which are displaced 90°, and a two-pole permanent magnet having a pair of pole faces for each pole thereof, of an electromagnet disposed within the armature cylinder and adapted to so displace the flux from the permanent magnet that the armature will have a torque proportional to the product of the current traversing it and the current traversing the electromagnet.

7. In a wattmeter for an electric circuit, the combination with a permanent magnet, and an armature cylinder having a winding that is supplied with current in accordance with the potential of the circuit, said cylinder being disposed between the poles of the magnet, of stationary means supplied with current in accordance with the current traversing the circuit and so disposed within the cylinder that the armature cylinder exerts a torque in accordance with the potential and current of the circuit.

8. A meter comprising a two-pole magnet having a substantially constant field and a pair of pole faces for each pole thereof, an armature cylinder disposed between the pole faces of the magnet and having a four-pole winding thereon, and electromagnetic means disposed concentrically with respect to the armature cylinder for shifting the flux from one pole face to another.

9. A meter comprising a two-pole magnet having a substantially constant field and a pair of pole faces for each of its poles, a two-part rotatable armature winding and a stationary two-pole electromagnet disposed within the armature, the axis of the electromagnet extending at substantially right angles to the magnetic axis of the two-pole magnet.

10. A meter comprising a permanent magnet having divided poles, an armature and a stationary electromagnet disposed within the armature having pole faces that are at right angles to the faces of the divided poles of the permanent magnet.

11. In a watthour meter, the combination with a hollow supporting cylinder, an armature winding thereon and damping means, of an electromagnet winding within the said armature cylinder, cylindrical externally split pole pieces extending within and without the said electromagnet winding at each end, and a non-magnetic means for separating the inner extension of said pole pieces.

12. In an electrical measuring instrument, the combination with an armature comprising a winding and a hollow cylindrical supporting structure, of permanent magnets, a bar of magnetic material connecting like poles of the said permanent magnets, pole pieces partially surrounding the said armature and connected to the said bars, an electromagnet winding within the said armature cylinder, an externally split pole piece at each end of the said electromagnet winding, and a non-magnetic body interposed between the said externally split pole pieces.

13. A meter comprising a two-pole magnet having a substantially constant field and a pair of pole faces for each pole thereof, an armature cylinder disposed between the pole faces of the magnet and having a four-pole winding thereon, and electromagnetic means disposed within the armature cylinder for shifting the flux from one pole face to another.

14. In a wattmeter for an electric circuit, the combination with a permanent magnet, and an armature cylinder disposed between the poles of the magnet and having a winding that is supplied with current in accordance with the potential of the circuit, of means disposed within the armature cylinder and energized in accordance with the current traversing the circuit for causing the armature cylinder to develop a torque in accordance with the power traversing the circuit.

In testimony whereof, I have hereto subscribed my name this 24th day of Sept., 1913.

THOMAS W. VARLEY.

Witnesses:
 INA BROWN,
 B. B. HINES.

Copies of this patent may be obtained for five cents each, by addressing the "Commissioner of Patents, Washington, D. C."